United States Patent [19]

Shibata et al.

[11] Patent Number: 5,304,393
[45] Date of Patent: Apr. 19, 1994

[54] METHOD FOR MANUFACTURING MAGNETIC RECORDING MEDIUM

[75] Inventors: Norio Shibata; Shinsuke Takahashi; Akihiro Suzuki, all of Kanagawa, Japan

[73] Assignee: Fuji Photo Film Co., Ltd., Kanagawa, Japan

[21] Appl. No.: 932,688

[22] Filed: Aug. 20, 1992

[30] Foreign Application Priority Data

Aug. 23, 1991 [JP] Japan .................................. 3-235684

[51] Int. Cl.[5] .............................................. H01F 10/02
[52] U.S. Cl. ..................................... 427/130; 427/131; 427/430.1
[58] Field of Search ............... 427/130, 131, 132, 599, 427/430.1; 428/694, 900

[56] References Cited

U.S. PATENT DOCUMENTS

| | | | |
|---|---|---|---|
| 2,932,855 | 4/1960 | Bartlett et al. | 427/131 X |
| 4,746,542 | 5/1988 | Chino et al. | 427/131 |
| 4,844,946 | 7/1989 | Komatsu et al. | 427/48 |
| 4,863,793 | 9/1989 | Ogawa et al. | 428/323 |

*Primary Examiner*—Bernard Pianalto
*Attorney, Agent, or Firm*—Sughrue, Mion, Zinn, Macpeak & Seas

[57] ABSTRACT

A magnetic recording medium manufacturing method in which a magnetic coating solution is applied as an upper-layer coating solution to a lower-layer coating solution which has been applied to a web in advance and is still wet. The magnetic coating solution is applied to the lower-layer coating solution, which has a thickness of 4 μm or less such that a stretch flow coefficient ε of the magnetic coating solution is 600 or less as determined from the equation $\alpha = V/v$, where V is the velocity of conveyance of the web and v is the average linear velocity of the magnetic coating solution at the opening of the slot.

4 Claims, 3 Drawing Sheets

METHOD FOR MANUFACTURING MAGNETIC RECORDING MEDIUM

BACKGROUND OF THE INVENTION

The present invention relates to a method for manufacturing a magnetic recording medium in which an extrusion-type coating apparatus is used to uniformly coat a flexible support (hereinafter referred to as a "web") made of a material such as plastic film, paper, or metal foil, with a magnetic coating solution to form at least the uppermost layer of the recording medium.

Numerous apparatus are known in the art to form a magnetic layer on a recording medium by known methods. For example, an extrusion-type coating apparatus, a curtain flow-type coating apparatus, a blade doctor-type coating apparatus, and a slide coat-type coating apparatus can all be used to coat a web with a coating solution to form a magnetic layer on a recording medium. Examples of the above apparatus are disclosed in Japanese Unexamined Patent Application Nos. 238179/1985, 88080/1988, 174965/1990 and 265672/1990, and Japanese Patent Application Publication No. 46186/1990. Of the known apparatus and methods, the extrusion-type coating apparatus is extensively employed in many industrial fields because it is superior in uniformly forming the layer on the web.

In the operation of the extrusion-type coating apparatus operates, while a web is run along the back edge surface and the doctor edge surface of the coating head of the apparatus, a coating solution is continuously discharged or extruded through a slot between the back edge surface and the doctor edge surface to coat the surface of the web.

Recent developments in recording media have presented difficult conditions for manufacturers to meet. For example, recently higher density recording media have been achieved by greatly increasing the number of layers formed on the web. In order to increase the number of layers on the web, the thickness of each layer must be reduced. In addition, new materials such as magnetic oxide particles or barium ferrite materials high in $S_{BET}$ value have been used to improve the magnetic characteristics of the media. These materials often require coating solutions with an increased viscosity. In addition, many manufacturers have been required to increase the speed of applying coating solutions to a web in order to increase the amount of production of the magnetic media per unit time.

The extrusion-type coating apparatus described above has many difficulties in meeting the above conditions. Indeed, the above-described method employed by the extrusion-type coating apparatus is able to achieve only a narrow range of satisfactory coating conditions, and therefore it is rather difficult to obtain satisfactory conditions for application of a coating solution. Moreover, these conditions are conventionally determined by trial and error. The determination of the coating conditions in this manner, however, lowers the yield of coating. As a result, the production is low in efficiency and the recording media produced is often unstable in quality.

Furthermore, because of the high aggregation of the coating solution, the layer formed on the web is lowered in surface characteristics and, therefore, it is difficult using the coating method to form a layer on a web which is stable in surface characteristics. For example, after a base layer of coating solution is formed on the web, a magnetic coating solution is applied to the base layer with a thickness of 4 μm or less while the base layer is still wet. If the magnetic coating solution is abruptly stretched near the opening of the slot, vortices and stagnant solution are generated around the opening of the slot. As a result, the interface between the base layer and the magnetic layer becomes irregular and foreign substances trapped in the coating solution or caught by the web are apt to form stripes on the coating layer. Such defects in the coating are unacceptable because they adversely affect characteristics of the medium such as the electromagnetic conversion characteristics (e.g., signal output and signal-to-noise (S/N) ratio).

SUMMARY OF THE INVENTION

Accordingly, an object of the present invention is to eliminate the above-described difficulties accompanying the conventional method for manufacturing a magnetic recording medium. More specifically, an object of the invention is to allow coating conditions for magnetic recording media to be easily determined to thus provide a magnetic recording medium manufacturing method in which the magnetic layer formed is satisfactory in coating characteristic and excellent in electromagnetic conversion characteristic.

In order to achieve the foregoing and other objects of the invention, the inventors have conducted intensive research on the factors which determine the coating conditions affecting the electromagnetic conversion characteristics and found that, although the configuration of the back edge surface and the doctor edge surface is important, the most important factor is the fluidity of the magnetic coating solution near the opening of the slot of the extruding-type coating apparatus and downstream of this position. Thus, in accordance with the invention, there is provided a magnetic recording medium manufacturing method in which an extrusion-type coating apparatus is used that continuously extrudes a coating solution from a slot to coat the surface of a flexible support (web). As the web is continuously conveyed over a back edge surface and a doctor edge surface of the coating apparatus, a magnetic coating solution is applied to a lower-layer coating solution. Extrusion is performed such that the coating solution has a thickness of 4 μm or less on top of the lower layer, which has been applied to the web in advance and is still wet. According to the invention, the magnetic coating solution is applied to the lower-layer coating solution such that a stretch flow coefficient ε of the magnetic coating solution is 600 or less as defined by the following equation:

$$\epsilon = V/v \qquad (1)$$

where V is the velocity of conveyance of the flexible web, and v is the average linear velocity of the magnetic coating solution as the solution is extruded.

In addition, there is provided a magnetic recording medium manufacturing method in which an extrusion-type coating apparatus is used to continuously extrude a plurality of coating solutions from a plurality of slots, thereby simultaneously coating the surface of a flexible support with the coating solutions.

The average linear velocity v of the magnetic coating solution at the opening of the slot is determined from various factors such as the configuration of the extrusion head, running velocity of the web, amount of supply, coating thickness, and other physical properties of the coating solution when the magnetic coating solution is applied to the web; however, the linear velocity can be substantially approximated by the following equation:

$$v = Q/L \quad (2)$$

where Q is the flow rate per unit width at the opening of the slot, and L is the width of the opening of the slot.

DESCRIPTION OF THE PREFERRED EMBODIMENTS

A magnetic recording medium manufacturing method according to the present invention will be described in detail with reference to the accompanying drawings.

Figure 1:
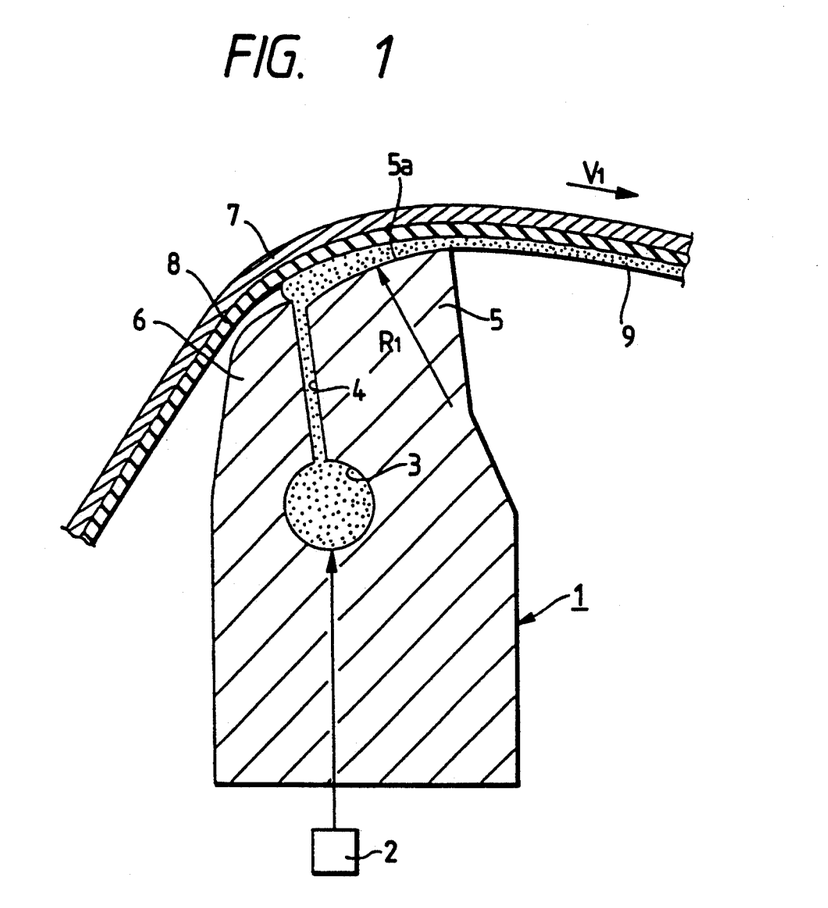
FIG. 1 is a sectional view showing part of an extrusion-type coating apparatus according to the present invention.

FIG. 1 illustrates an extrusion-type coating apparatus used to perform the method of the invention. The apparatus has an extrusion head 1 which is composed of a solution supplying system 2, a pocket 3, a slot 4, a doctor edge portion 5, and a back edge portion 6. In operation, a web 7, to which a lower-layer coating solution 8 has been applied in advance, is continuously conveyed at a predetermined velocity ($V_1$). The lower layer may be a magnetic coating solution or a non-magnetic coating solution Using the extrusion head 1, an upper-layer coating solution 9 is uniformly applied to the lower-layer coating solution 8 on the web while the lower layer is still wet. The solution 9 is applied with a thickness of $t_1$ (wet thickness) of 4 μm or less.

The solution supplying system 2, which is provided outside the extrusion head 1, is composed of metering pump (not shown) for continuously supplying the upper-layer coating solution 9 at a predetermined flow rate. The pump is connected through pipes with the pocket 3. The pocket 3 is formed in the extrusion head 1 in such a manner that the pocket 3 is extended in the direction of the width of the web 7.

Figure 2:
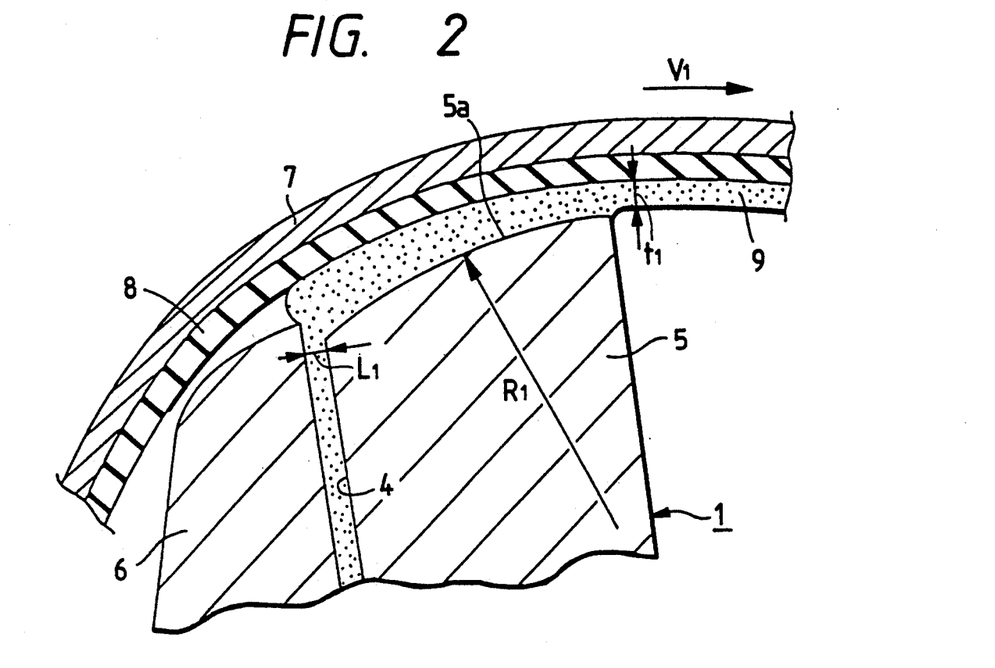
FIG. 2 is an enlarged sectional view showing an doctor edge in the extrusion-type coating apparatus according to the present invention.

As shown in FIG. 2, the slot 4 is a relatively narrow flow path formed in the body of the extrusion head 1 with an opening width ($L_1$) extending in the direction of the width of web 7, much like pocket 3. The length of the opening in the direction of the width of web 7 is substantially equal to the coating width.

The doctor edge portion 5 is located downstream of the opening of the slot 4 (as viewed in the direction of conveyance of the web 7), and it has an edge surface 5a which confronts the web 7. The edge surface 5a is curved in section with a radius of curvature $R_1$.

The back edge portion 6 is located upstream of the opening of the slot 4 (as viewed in the direction of conveyance of the web), and it has an edge surface which confronts the web 7.

When the upper-layer coating solution 9 is applied to the web 7 with the extrusion head 1, a flow rate $Q_1$ per unit width of the upper-layer coating solution 9 at the opening of the slot 4 is as follows:

$$Q_1 = V_1 \times t_1 \quad (3)$$

Hence, in the embodiment described above, the average linear velocity $v_1$ of the upper-layer coating solution 9 can be approximated by the following equation:

$$v_1 = Q_1/L \quad (4)$$

However, it should be noted that the average linear velocity $v_1$ can be approximated or measured by other methods.

The approximation of the average linear velocity $v_1$ of the upper-layer coating solution 9 thus obtained and the velocity of conveyance $V_1$ of the web are utilized to determine a stretch flow coefficient $\epsilon_1$ for the coating solution. Under the condition that the stretch flow coefficient $\epsilon_1$ is 600 or less, the upper-layer coating solution 9 is applied to the web 7.

Limiting the stretch flow coefficient $\epsilon_1$ in this manner controls the fluidity of the upper-layer coating solution near the opening of the slot 4 or downstream of it. Thus, coating conditions for obtaining excellent electromagnetic conversion characteristics can be determined best by first defining the stretch flow coefficient of the upper-layer coating solution 9.

In the above-described magnetic recording medium manufacturing method of the invention, the configuration of the extrusion head is not limiting. Thus, the technical concept of the invention can be applied to other extrusion heads which have different configurations than that described above.

Figure 3:
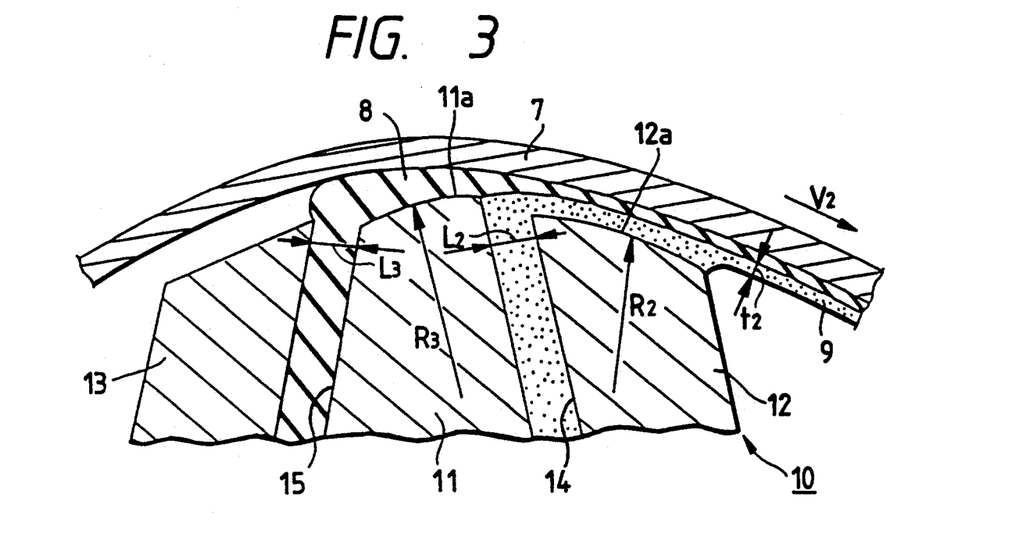
FIG. 3 is an enlarged sectional view showing an doctor edge in another extrusion-type coating apparatus according to the invention.
Figure 4:
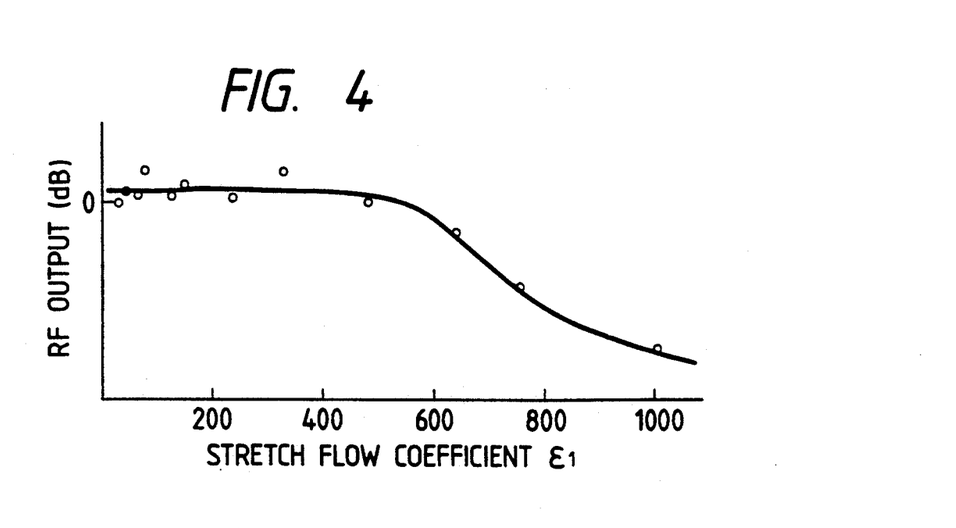
FIG. 4 is a graphical representation of a stretch flow coefficient with RF output in an Example 1.

In the above-described embodiment, after a lower-layer coating solution is applied to the web, the upper-layer coating solution 9 is applied to the lower-layer coating solution 8 before the lower layer is dried. However, in accordance with another embodiment of the invention, the lower-layer coating solution 8 and the upper-layer coating solution 9 may be applied to the web at the same time using the extrusion head 10, as shown in FIG. 3.

The extrusion head 10 has a first slot 15, a second slot 14, a back edge portion 13, a first doctor edge portion 11, and a second doctor edge portion 12. A lower-layer coating solution 8, which may be either a magnetic coating solution or a non-magnetic coating solution, and an upper-layer coating solution 9 having a thickness ($t_2$) of 4 μm or less, which is a magnetic coating solution, are uniformly applied to a web 7 while the web 7 is continuously conveyed at a predetermined velocity $V_2$.

The first slot 15 and the second slot 14 are relatively narrow flow paths which communicate with pockets (not shown) and which are formed in the body of the extrusion head 10 with opening widths $L_3$ and $L_2$, respectively, in such a manner that they extend in the direction of width of the web 7. It should be noted that the lengths of the openings in the direction of width of the web 7 are substantially equal to the coating widths of the corresponding layers 8 and 9.

The first doctor edge portion 11 is located downstream of the opening of the first slot 15, as viewed in the direction of conveyance of the web 7, and has an edge surface 11a which confronts the web 7. The edge surface 11a is curved in section with a radius of curvature $R_3$. The second doctor edge portion 12 is located downstream of the opening of the second slot 14, which is itself located downstream of the opening of the second slot 15, as viewed in the direction of conveyance of the web 7. Edge portion 12 has an edge surface 12a which confronts the web 7. The edge surface 12a is curved in section with a radius of curvature $R_2$. The above-described configurations of the first and second doctor edge portions 11 and 12 are not limiting; that is, the edge portions 11 and 12 may be formed by using curved surfaces or flat surfaces, or combinations of curved surfaces and flat surfaces.

The back edge portion 13 is located upstream of the opening of the slot 15, as viewed in the direction of conveyance of the web 7, and it has an edge surface which is confronted with the web 7.

In the case where the lower-layer coating solution 8 and the upper-layer coating solution 9 are applied simultaneously to the web 7 using the extrusion head 10, the flow rate $Q_2$ per unit width of the upper-layer coating solution 9 at the opening of the slot 14 can be represented by the following equation:

$$Q_2 = V_2 \times t_2 \quad (5)$$

Hence, in the present embodiment, the average linear velocity $v_2$ of the upper-layer coating solution 9 can be approximated by the following equation:

$$v_2 = Q_2 / L_2 \quad (6)$$

However, it should be noted that the average linear velocity $v_2$ can be approximated or measured by other methods.

The approximation of the average linear velocity $v_2$ of the upper-layer coating solution 9 thus obtained and the velocity of conveyance $V_2$ of the web are utilized to determine a stretch flow coefficient $\epsilon_2$ for the coating solution. Where the stretch flow coefficient $\epsilon_2$ is 600 or less, the lower layer of coating solution 8 and the upper-layer coating solution 9 are applied to web 7.

Limiting the stretch flow coefficient $\epsilon_2$ regulates the fluidity of the upper-layer coating solution 9 near the opening of the slot 14 or downstream of it. That is, the dual coating conditions for providing excellent electromagnetic conversion characteristics can be determined best by defining the stretch flow coefficient of the upper-layer coating solution 9 when the solution has a thickness of 4 μm or less.

As was described above, in the present embodiment, two layers of coating solution are formed on the web simultaneously. Thus, as in the above-described method, the coating conditions can easily be controlled even when forming more than two layers of coating solution on the web simultaneously. In the above-described embodiments, the lower-layer coating solution 8 and the upper-layer coating solution 9 are applied directly to the web 7; however, they may be applied to an undercoat layer formed on the web 7 in advance and is either wet or dry.

It should be noted that the flexible support (web) used in the method of the invention may be made of, for example, macromolecular film of polyethylne terephthalate and the like, paper, or metal.

Using the magnetic recording medium manufacturing method of the invention, after formation of a lower layer of coating solution on a web, a magnetic coating solution is applied to the lower layer while the latter is still wet to form a magnetic layer. The magnetic layer thus formed is satisfactory in coating characteristic, and the magnetic recording medium thus manufactured is sufficiently high in electromagnetic conversion characteristic.

EXAMPLES OF THE INVENTION

As conducive to a full understanding of the novel effects of the present invention, specific Examples of the magnetic recording medium manufacturing method of the invention will be described below.

Coating Solutions:

Coating solutions A, B, C and D were prepared by mixing and dispersing the following components with a ball mill:

| Coating Solution A: | |
|---|---|
| (Composition) | |
| Fe/Zn/Ni(92:4:4 in weight ratio) powder (acicular particles having an average particle size of 0.20 μm in the direction of long axis and a coercive force of 1600 Oe) | 300 parts by weight |
| vinyl chloride - vinyl acetate copolymer (copolymerization ratio 87:13, and copolymerization degree 400) | 30 parts by weight |
| electrically conductive carbon | 20 parts by weight |
| polyamide resin (amine value 300) | 15 parts by weight |
| lecithin | 6 parts by weight |
| silicon oil (dimethyl polysiloxane) | 3 parts by weight |
| cyclohexanone | 300 parts by weight |
| methyl ethyl ketone | 300 parts by weight |
| n-butanol | 100 parts by weight |

The viscisity of the coating solution A was 0.9 poise with a shear rate of $5 \times 10^2 \sec^{-1}$.

| Coating Solution B: | |
|---|---|
| (Composition) | |
| α-Fe$_2$O$_3$ powder (acicular particles having an average particle size of 0.27 μm in the direction of long axis) | 300 parts by weight |
| vinyl chloride - vinyl acetate copolymer (copolymerization ratio 87:13, and copolymerization degree 400) | 30 parts by weight |
| electrically conductive carbon | 20 parts by weight |
| polyamide resin (amine value 300) | 15 parts by weight |
| lecithin | 6 parts by weight |
| silicon oil (dimethyl polysiloxane) | 3 parts by weight |
| xylol | 300 parts by weight |
| methyl isobutyl ketone | 300 parts by weight |
| n-butanol | 100 parts by weight |

The viscosity of the coating solution B was 0.7 poise with a shear rate of $5 \times 10^2 \sec^{-1}$.

| Coating Solution C: | |
|---|---|
| (Composition) | |
| Fe/Zn/Ni (92:4:4 in weight ratio) powder (acicular particles having an average particle size of 0.20 μm in the direction of long axis, and a coercive force of 320 Oe) | 300 parts by weight |

Coating Solution C:

| (Composition) | |
|---|---|
| vinyl chloride - vinyl acetate copolymer (copolymerization ratio 87:13, and copolymerization degree 400) | 30 parts by weight |
| electrically conductive carbon | 20 parts by weight |
| polyamide resin (amine value 300) | 15 parts by weight |
| lecithin | 6 parts by weight |
| silicon oil (dimethyl polysiloxane) | 3 parts by weight |
| cyclohexanone | 500 parts by weight |
| n-butanol | 100 parts by weight |

The viscosity of the coating solution C was 1.4 poise with a shear rate of $5 \times 10^2 \text{ sec}^{-1}$.

Coating Solution D:

| (Composition) | |
|---|---|
| $TiO_2$ powder (average primary particle size 0.05 μm, $S_{BET}$ value 18 m²/g) | 300 parts by weight |
| vinyl chloride - vinyl acetate copolymer (copolymerization ratio 87:13, and copolymerization degree 400) | 30 parts by weight |
| electrically conductive carbon | 20 parts by weight |
| polyamide resin (amine value 300) | 15 parts by weight |
| lecithin | 6 parts by weight |
| silicon oil (dimethyl polysiloxane) | 3 parts by weight |
| cyclohexanone | 500 parts by weight |
| n-butanol | 100 parts by weight |

The viscosity of the coating solution D was 0.9 poise with a shear rate of $5 \times 10^2 \text{ sec}^{-1}$.

EXAMPLE 1

The above-described coating solution B (coating quantity 10 cc/m²) was applied to polyethylene terephtalate flexible support (web), which was 10 μm in thickness and 300 mm in width, with the above-described extrusion head 1 to form a lower layer of coating solution on the web. Thereafter, the above-described coating solution A, which was a magnetic coating solution, was applied to the lower layer of coating solution while the lower layer was still wet, using five different extrusion heads of the above-described type having respective widths $L_1$ of 0.25 mm, 0.5 mm, 1.0 mm, 2.0 mm, and 3.0 mm. The coating solution was applied to form upper layers of coating solution on the web, thus providing different specimens. The coating conditions provided for the upper layers of coating solution were as follows. A tension applied to the web was 5 kg/300 mm width, the coating velocity $V_1$ was varied between 300 m/min and 600 m/min, and the coating thickness $t_1$ was varied among 4.0, 3.0, 2.0 and 1.0 μm. In each of the extrusion heads, the radius of curvature $R_1$ of the doctor edge surface was 2.50 mm, and the width of the doctor edge (measured in the direction of conveyance of the web) was 0.75 mm.

The surfaces of the magnetic layers formed under the different coating conditions with the different extrusion heads were observed, and the results of observation are as listed in the following Table 1.

TABLE 1

| Specimen No. | Slot Width $L_1$ (mm) | Coating Velocity $V_1$ (m/min) | Coating Thickness $t_1$ (μm) | Coating Solution Average velocity $V_1$ (m/sec) | Stretch Flow Coefficient $\epsilon_1$ | Surface qualities |
|---|---|---|---|---|---|---|
| 1 | 0.25 | | 4.0 | 0.08 | 62.5 | ○ |
| 2 | | 300 | 3.0 | 0.06 | 83.3 | ○ |
| 3 | | | 2.0 | 0.04 | 125 | ○ |
| 4 | | | 1.0 | 0.02 | 250 | ○ |
| 5 | | | 4.0 | 0.16 | 62.5 | ○ |
| 6 | | 600 | 3.0 | 0.12 | 83.3 | ○ |
| 7 | | | 2.0 | 0.08 | 125 | ○ |
| 8 | | | 1.0 | 0.04 | 250 | ○ |
| 9 | 0.5 | | 4.0 | 0.04 | 125 | ○ |
| 10 | | 300 | 3.0 | 0.03 | 167 | ○ |
| 11 | | | 2.0 | 0.02 | 250 | ○ |
| 12 | | | 1.0 | 0.01 | 500 | ○ |
| 13 | | | 4.0 | 0.08 | 125 | ○ |
| 14 | | 600 | 3.0 | 0.06 | 167 | ○ |
| 15 | | | 2.0 | 0.04 | 250 | ○ |
| 16 | | | 1.0 | 0.02 | 500 | ○ |
| 17 | 1.0 | | 4.0 | 0.02 | 250 | ○ |
| 18 | | 300 | 3.0 | 0.015 | 333 | ○ |
| 19 | | | 2.0 | 0.01 | 500 | ○ |
| 20 | | | 1.0 | 0.005 | 1000 | X |
| 21 | | | 4.0 | 0.04 | 250 | ○ |
| 22 | | 600 | 3.0 | 0.03 | 333 | ○ |
| 23 | | | 2.0 | 0.02 | 500 | ○ |
| 24 | | | 1.0 | 0.01 | 1000 | X |
| 25 | 2.0 | | 4.0 | 0.01 | 500 | ○ |
| 26 | | 300 | 3.0 | 0.0075 | 667 | X |
| 27 | | | 2.0 | 0.005 | 1000 | X |
| 28 | | | 1.0 | 0.0025 | 2000 | X |
| 29 | | | 4.0 | 0.02 | 500 | ○ |
| 30 | | 600 | 3.0 | 0.015 | 667 | △ |
| 31 | | | 2.0 | 0.01 | 1000 | X |
| 32 | | | 1.0 | 0.005 | 2000 | X |
| 33 | 3.0 | | 4.0 | 0.007 | 750 | X |
| 34 | | 300 | 3.0 | 0.005 | 1000 | X |
| 35 | | | 2.0 | 0.0033 | 1500 | X |
| 36 | | | 1.0 | 0.0017 | 3000 | X |
| 37 | | | 4.0 | 0.013 | 750 | X |
| 38 | | 600 | 3.0 | 0.01 | 1000 | X |

TABLE 1-continued

| Specimen No. | Slot Width $L_1$ (mm) | Coating Velocity $V_1$ (m/min) | Coating Thickness $t_1$ (μm) | Coating Solution Average velocity $V_1$ (m/sec) | Stretch Flow Coefficient $\epsilon_1$ | Surface qualities |
|---|---|---|---|---|---|---|
| 39 | | | 2.0 | 0.0067 | 1500 | X |
| 40 | | | 1.0 | 0.0033 | 3000 | X |

X = a number of fine strips formed; rough surface formed
Δ = a few fine strips formed
° = no fine strips formed

EXAMPLE 2

Specimens were formed under the same coating conditions as in the above-described Example 1, except that the coating solution B (coating quantity: 10 cc/m²) and the coating solution A, which was the magnetic coating solution, were simultaneously applied to a polyethylene terephthalate flexible support (web) 10 μm in thickness and 300 mm in width. The solutions were applied using the above-described extrusion head 10 to simultaneously form a lower layer of coating solution and an upper layer of coating solution on the web. As in Example 1, five extrusion heads were used having a slot width $L_2$ of the second slot of the extrusion heads set to 0.25 mm, 0.5 mm, 1.0 mm, 2.0 mm, and 3.0 mm, respectively. In each of the extrusion heads, the radius of curvature $R_3$ of the edge surface of the first doctor edge was 1.75 mm, and the width of the first doctor edge (measured in the direction of conveyance of the web) was 0.57 mm; for the second doctor edge, the radius of curvature $R_2$ of the edge surface was 3.50 mm, and the width of the second doctor edge was 1.14 mm.

The surfaces of the magnetic layers formed under the different coating conditions with the different extrusion heads were observed, and the results of observation are as listed in the following Table 2.

TABLE 2

| Specimen No. | Slot Width $L_1$ (mm) | Coating Velocity $V_1$ (m/min) | Coating Thickness $t_1$ (μm) | Coating Solution Average velocity $V_1$ (m/sec) | Stretch Flow Coefficient $\epsilon_1$ | Surface qualities |
|---|---|---|---|---|---|---|
| 41 | 0.25 | | 4.0 | 0.08 | 62.5 | ° |
| 42 | | 300 | 3.0 | 0.06 | 83.3 | ° |
| 43 | | | 2.0 | 0.04 | 125 | ° |
| 43 | | | 2.0 | 0.04 | 125 | ° |
| 44 | | | 1.0 | 0.02 | 250 | ° |
| 45 | | | 4.0 | 0.16 | 62.5 | ° |
| 46 | | 600 | 3.0 | 0.12 | 83.3 | ° |
| 47 | | | 2.0 | 0.08 | 125 | ° |
| 48 | | | 1.0 | 0.04 | 250 | ° |
| 49 | 0.5 | | 4.0 | 0.04 | 125 | ° |
| 50 | | 300 | 3.0 | 0.03 | 167 | ° |
| 51 | | | 2.0 | 0.02 | 250 | ° |
| 52 | | | 1.0 | 0.01 | 500 | ° |
| 53 | | | 4.0 | 0.08 | 125 | ° |
| 54 | | 600 | 3.0 | 0.06 | 167 | ° |
| 55 | | | 2.0 | 0.04 | 250 | ° |
| 56 | | | 1.0 | 0.02 | 500 | ° |
| 57 | 1.0 | | 4.0 | 0.02 | 250 | ° |
| 58 | | 300 | 3.0 | 0.015 | 333 | ° |
| 59 | | | 2.0 | 0.01 | 500 | ° |
| 60 | | | 1.0 | 0.005 | 1000 | X |
| 61 | | | 4.0 | 0.04 | 250 | ° |
| 62 | | 600 | 3.0 | 0.03 | 333 | ° |
| 63 | | | 2.0 | 0.02 | 500 | ° |
| 64 | | | 1.0 | 0.01 | 1000 | X |
| 65 | 2.0 | | 4.0 | 0.01 | 500 | ° |
| 66 | | 300 | 3.0 | 0.0075 | 667 | Δ |
| 67 | | | 2.0 | 0.005 | 1000 | X |
| 68 | | | 1.0 | 0.0025 | 2000 | X |
| 69 | | | 4.0 | 0.02 | 500 | ° |
| 70 | | 600 | 3.0 | 0.015 | 667 | X |
| 71 | | | 2.0 | 0.01 | 1000 | X |
| 72 | | | 1.0 | 0.005 | 2000 | X |
| 73 | 3.0 | | 4.0 | 0.007 | 750 | X |
| 74 | | 300 | 3.0 | 0.005 | 1000 | X |
| 75 | | | 2.0 | 0.0033 | 1500 | X |
| 76 | | | 1.0 | 0.0017 | 3000 | X |
| 77 | | | 4.0 | 0.013 | 750 | X |
| 78 | | 600 | 3.0 | 0.01 | 1000 | X |
| 79 | | | 2.0 | 0.0067 | 1500 | X |
| 80 | | | 1.0 | 0.0033 | 3000 | X |

Figure 5:
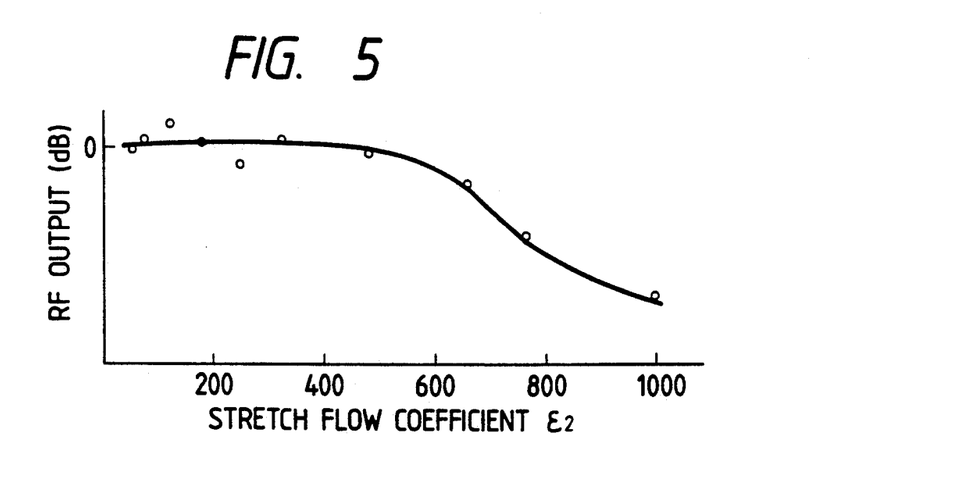
FIG. 5 is a graphical representation of a stretch flow coefficient with RF output in an Example 2.

In addition, the RF outputs were measured, and the results of measurement are as shown in FIG. 5. The measurement of the RF outputs was carried out in the same manner as in the above-described Example 1.

EXAMPLE 3

Specimens were formed under the same coating conditions as those in the above-described Example 2, except that the coating solution D was used for formation of a lower layer of coating solution, while the coating solution C (the magnetic coating solution) was used for formation of an upper layer of coating solution.

The surfaces of the magnetic layers formed under the different coating conditions with the different extrusion heads were observed, and the results of observation are as listed in the following Table 3.

TABLE 3

| Specimen No. | Slot Width $L_1$ (mm) | Coating Velocity $V_1$ (m/min) | Coating Thickness $t_1$ (μm) | Coating Solution Average velocity $v_1$ (m/sec) | Stretch Flow Coefficient $\epsilon_1$ | Surface qualities |
|---|---|---|---|---|---|---|
| 81 | 0.25 | | 4.0 | 0.08 | 62.5 | o |
| 82 | | 300 | 3.0 | 0.06 | 83.3 | o |
| 83 | | | 2.0 | 0.04 | 125 | o |
| 84 | | | 1.0 | 0.02 | 250 | o |
| 85 | | | 4.0 | 0.16 | 62.5 | o |
| 86 | | 600 | 3.0 | 0.12 | 83.3 | o |
| 87 | | | 2.0 | 0.08 | 125 | o |
| 88 | | | 1.0 | 0.04 | 250 | o |
| 89 | 0.5 | | 4.0 | 0.04 | 125 | o |
| 90 | | 300 | 3.0 | 0.03 | 167 | O |
| 91 | | | 2.0 | 0.02 | 250 | o |
| 92 | | | 1.0 | 0.01 | 500 | o |
| 93 | | | 4.0 | 0.08 | 125 | o |
| 94 | | 600 | 3.0 | 0.06 | 167 | o |
| 95 | | | 2.0 | 0.04 | 250 | o |
| 96 | | | 1.0 | 0.02 | 500 | o |
| 97 | 1.0 | | 4.0 | 0.02 | 250 | o |
| 98 | | 300 | 3.0 | 0.015 | 333 | o |
| 99 | | | 2.0 | 0.01 | 500 | o |
| 100 | | | 1.0 | 0.005 | 1000 | X |
| 101 | | | 4.0 | 0.04 | 250 | o |
| 102 | | 600 | 3.0 | 0.03 | 333 | o |
| 103 | | | 2.0 | 0.02 | 500 | o |
| 104 | | | 1.0 | 0.01 | 1000 | X |
| 105 | 2.0 | | 4.0 | 0.01 | 500 | o |
| 106 | | 300 | 3.0 | 0.0075 | 667 | Δ |
| 107 | | | 2.0 | 0.005 | 1000 | X |
| 108 | | | 1.0 | 0.0025 | 2000 | X |
| 109 | | | 4.0 | 0.02 | 500 | o |
| 110 | | 600 | 3.0 | 0.015 | 667 | X |
| 111 | | | 2.0 | 0.01 | 1000 | X |
| 112 | | | 1.0 | 0.005 | 2000 | X |
| 113 | 3.0 | | 4.0 | 0.007 | 750 | X |
| 114 | | 300 | 3.0 | 0.005 | 1000 | X |
| 115 | | | 2.0 | 0.0033 | 1500 | X |
| 116 | | | 1.0 | 0.0017 | 3000 | X |
| 117 | | | 4.0 | 0.013 | 750 | X |
| 118 | | 600 | 3.0 | 0.01 | 1000 | X |
| 119 | | | 2.0 | 0.0067 | 1500 | X |
| 120 | | | 1.0 | 0.0033 | 3000 | X |

Figure 6:
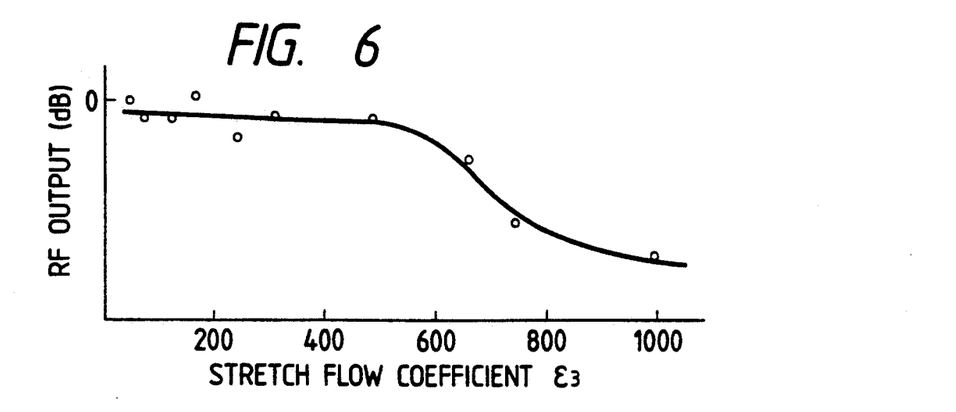
FIG. 6 is a graphical representation indicating a stretch flow coefficient with RF output in an Example 3.

In addition, the RF outputs were measured, and the results of measurement are as shown in FIG. 6. The measurement of the RF outputs was carried out in the same manner as in the above-described Examples 1 and 2.

As is apparent from the above-described Examples, in the case where an extrusion-type coating apparatus was used to apply a magnetic coating layer having a stretch flow coefficient $\epsilon$ of 600 or more, fine stripes were formed on the surface of the magnetic layer, thereby resulting in a magnetic layer that was low in electromagnetic conversion characteristics.

Hence, it can be understood from the above-described Examples that, in the case where an extrusion-type coating apparatus is to be used to apply a magnetic coating solution with excellent electromagnetic conversion characteristics, the stretch flow coefficient $\epsilon$ of the magnetic coating solution should be 600 or less.

What is claimed is:

1. A magnetic recording medium manufacturing method for use with an extrusion-type coating apparatus that coats a web with a magnetic coating solution, said web having a wet first layer of coating serving as a base for the magnetic coating solution, the manufacturing method comprising the steps of:

continuously extruding a magnetic coating solution to coat said web; and applying said magnetic coating solution thus extruded as a second layer of coating solution on said web as said web is continuously conveyed to said coating apparatus, wherein said coating solution is applied to said first layer of coating solution while said first layer of coating solution is still wet, and wherein a stretch flow coefficient $\epsilon$ of said magnetic coating solution is 600 or less, as determined by the equation $$\epsilon = V/v,$$

where V is the velocity of conveyance of said web, and v is the average linear velocity of said magnetic coating solution.

2. The magnetic recording medium manufacturing method of claim 1, further comprising the step of drying said web after the magnetic coating solution has been applied in said applying step.

3. The magnetic recording medium manufacturing method of claim 2, wherein said second layer of coating solution has a thickness of 4 μm or less, and said first layer is also formed with a magnetic solution.

4. The magnetic recording medium manufacturing method of claim 1, wherein said extrusion-type coating apparatus has a plurality of slots for respectively extruding a plurality of coating solutions, including the coating solution for said first and second layers, wherein said step of applying comprises the step of applying a coating solution to said web as said first layer at the same time as said magnetic solution is applied to said web as said second layer.

* * * * *